(12) United States Patent
Levi et al.

(10) Patent No.: US 11,100,344 B2
(45) Date of Patent: Aug. 24, 2021

(54) IMAGE-BASED THREE-DIMENSIONAL LANE DETECTION

(71) Applicant: GM Global Technology Operations LLC, Detroit, MI (US)

(72) Inventors: Dan Levi, Kiryat Ono (IL); Noa Garnett, Herzliya (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 118 days.

(21) Appl. No.: 16/691,014

(22) Filed: Nov. 21, 2019

(65) Prior Publication Data
US 2021/0158058 A1    May 27, 2021

(51) Int. Cl.
| | |
|---|---|
| *G06K 9/00* | (2006.01) |
| *G06T 7/543* | (2017.01) |
| *G05D 1/02* | (2020.01) |
| *G05D 1/00* | (2006.01) |

(52) U.S. Cl.
CPC ....... *G06K 9/00798* (2013.01); *G05D 1/0088* (2013.01); *G05D 1/0251* (2013.01); *G06T 7/543* (2017.01); *G05D 2201/0213* (2013.01); *G06T 2207/20081* (2013.01); *G06T 2207/20084* (2013.01); *G06T 2207/30256* (2013.01)

(58) Field of Classification Search
CPC ............. G06K 9/00798; G05D 1/0088; G05D 1/0251; G05D 2201/0213; G06T 7/543; G06T 2207/20084; G06T 2207/30256; G06T 2207/20081
See application file for complete search history.

(56) References Cited

U.S. PATENT DOCUMENTS

| | | | |
|---|---|---|---|
| 2016/0125612 A1* | 5/2016 | Seki ................... | G06K 9/00798 |
| | | | 382/106 |
| 2016/0258764 A1* | 9/2016 | Phuyal ................ | G09B 29/007 |
| 2017/0278014 A1* | 9/2017 | Lessmann ................ | G06T 5/20 |
| 2018/0129887 A1* | 5/2018 | Kang ................. | G06K 9/00798 |
| 2018/0373941 A1* | 12/2018 | Kwant ................ | G08G 1/0129 |
| 2019/0035101 A1* | 1/2019 | Kwant ................. | G06N 3/0454 |
| 2019/0266772 A1* | 8/2019 | Li ............................. | G06T 3/40 |
| 2019/0384304 A1* | 12/2019 | Towal .................. | G05D 1/0221 |
| 2020/0074189 A1* | 3/2020 | Xie ..................... | G06K 9/00798 |
| 2020/0110416 A1* | 4/2020 | Hong .................... | G06N 20/00 |
| 2020/0151465 A1 | 5/2020 | Levi et al. | |
| 2020/0210769 A1* | 7/2020 | Hou ................... | G06K 9/00798 |

* cited by examiner

*Primary Examiner* — Shervin K Nakhjavan
(74) *Attorney, Agent, or Firm* — Cantor Colburn LLP

(57) ABSTRACT

Systems and methods to perform image-based three-dimensional (3D) lane detection involve obtaining known 3D points of one or more lane markings in an image including the one or more lane markings. The method includes overlaying a grid of anchor points on the image. Each of the anchor points is a center of i concentric circles. The method also includes generating an i-length vector and setting an indicator value for each of the anchor points based on the known 3D points as part of a training process of a neural network, and using the neural network to obtain 3D points of one or more lane markings in a second image.

20 Claims, 4 Drawing Sheets

IMAGE-BASED THREE-DIMENSIONAL LANE DETECTION

INTRODUCTION

The subject disclosure relates to image-based three-dimensional (3D) lane detection.

Vehicles (e.g., automobiles, trucks, construction equipment, farm equipment, automated factory equipment) are increasingly available with autonomous or semi-autonomous operational capabilities. The autonomous or semi-autonomous (e.g., collision avoidance, adaptive cruise control, automatic braking, lane departure detection) operations rely on sensors that detect information about the vehicle and its environment. Exemplary sensors include cameras, radar systems, and lidar systems. Exemplary information obtained by the sensors includes operational status of the vehicle (e.g., speed, heading, yaw rate) and context information (e.g., position of vehicle within lane or relative to adjacent vehicle). The detection of lanes, which is facilitated by the detection of lane lines, center lines, and other lane markings in the road, is necessary for many semi-autonomous operations, as well as for autonomous operation. Accordingly, it is desirable to provide image-based three-dimensional (3D) lane detection.

SUMMARY

In one exemplary embodiment, a method of performing image-based three-dimensional (3D) lane detection includes obtaining known 3D points of one or more lane markings in an image including the one or more lane markings, and overlaying a grid of anchor points on the image. Each of the anchor points is a center of i concentric circles. The method also includes generating an i-length vector and setting an indicator value for each of the anchor points based on the known 3D points as part of a training process of a neural network, and using the neural network to obtain 3D points of one or more lane markings in a second image.

In addition to one or more of the features described herein, for each one of the one or more lane markings, the method includes determining a closest one of the anchor points to a starting point of the one of the one or more lane markings as being an associated anchor point of the one of the one or more lane markings.

In addition to one or more of the features described herein, for each one of the one or more lane markings, the method includes obtaining an intersection of the one of the one or more lane markings with each concentric circle of the associated anchor point and an elevation at the intersection.

In addition to one or more of the features described herein, for the associated anchor point associated with each one of the one or more lane markings, the i-length vector includes i pairs of the intersection and the elevation associated with the i concentric circles and the indicator value of 1.

In addition to one or more of the features described herein, for each of the anchor points that is not one of the associated anchor points, the i-length vector is values of <0, 0> and the indicator value is 0 or a value greater than 0 but less than 1.

In addition to one or more of the features described herein, the method includes overlaying the grid of anchor points and the concentric circles corresponding with each of the anchor points on the second image.

In addition to one or more of the features described herein, the method includes obtaining an i-length vector for each of the anchor points on the second image.

In addition to one or more of the features described herein, the using the neural network to obtain the 3D points of the one or more lane markings in the second image includes translating the i-length vector for each of the anchor points on the second image to the 3D points of the one or more lane markings in the second image based on the training process of the neural network.

In addition to one or more of the features described herein, the method includes obtaining the second image using a camera of a vehicle.

In addition to one or more of the features described herein, the method includes performing autonomous or semi-autonomous operation of the vehicle using the 3D points of the one or more lane markings in the second image.

In another exemplary embodiment, a system to perform image-based three-dimensional (3D) lane detection includes a camera to obtain an image including one or more lane markings, and a controller to obtain known 3D points of the one or more lane markings in the image and to overlay a grid of anchor points on the image. Each of the anchor points is a center of i concentric circles. The controller also generates an i-length vector and an indicator value for each of the anchor points based on the known 3D points as part of a training process of a neural network and uses the neural network to obtain 3D points of one or more lane markings in a second image.

In addition to one or more of the features described herein, for each one of the one or more lane markings, the controller determines a closest one of the anchor points to a starting point of the one of the one or more lane markings as being an associated anchor point of the one of the one or more lane markings.

In addition to one or more of the features described herein, for each one of the one or more lane markings, the controller obtains an intersection of the one of the one or more lane markings with each concentric circle of the associated anchor point and an elevation at the intersection.

In addition to one or more of the features described herein, for the associated anchor point associated with each one of the one or more lane markings, the controller determines the i-length vector as i pairs of the intersection and the elevation associated with the i concentric circles and the indicator value as 1.

In addition to one or more of the features described herein, for each of the anchor points that is not one of the associated anchor points, the controller determines the i-length vector as i values of <0, 0> and the indicator value as 0 or a value greater than 0 but less than 1.

In addition to one or more of the features described herein, the controller overlays the grid of anchor points and the concentric circles corresponding with each of the anchor points on the second image.

In addition to one or more of the features described herein, the controller obtains an i-length vector for each of the anchor points on the second image.

In addition to one or more of the features described herein, the controller translates the i-length vector for each of the anchor points on the second image to the 3D points of the one or more lane markings in the second image based on the training process of the neural network.

In addition to one or more of the features described herein, the camera obtains the second image and the camera is in a vehicle.

In addition to one or more of the features described herein, the controller performs autonomous or semi-autonomous operation of the vehicle using the 3D points of the one or more lane markings in the second image.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
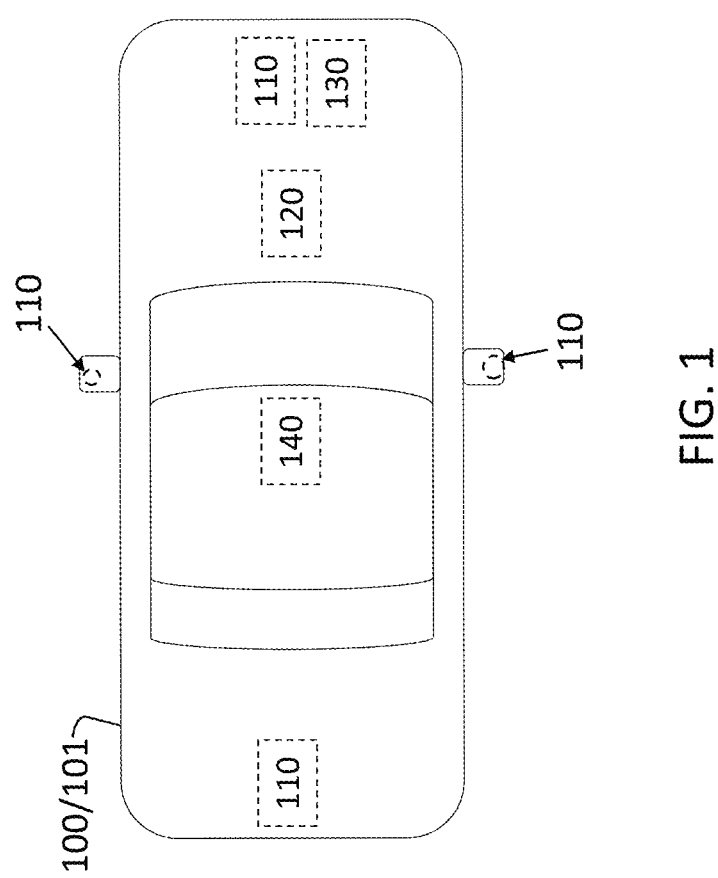
FIG. 1 is a block diagram of a vehicle that performs image-based three-dimensional lane detection according to one or more embodiments.

The following description is merely exemplary in nature and is not intended to limit the present disclosure, its application or uses. It should be understood that throughout the drawings, corresponding reference numerals indicate like or corresponding parts and features.

As previously noted, autonomous or semi-autonomous operation of a vehicle requires information about the vehicle and its surroundings. The information needed for vehicle operation includes an accurate detection of the lanes designated on the roadway. This information is required to ensure safe operation and autonomous or semi-autonomous navigation by the vehicle. While lane detection on highways or in urban areas between intersections is less problematic, lane detection through intersections or in areas where lanes cross is more complicated. This is because of the curvature of the lanes (e.g., lane indicating a 90 degree turn). Generally, according to prior approaches, relatively straight lane segments on either side of an intersection must be detected and heuristically combined, for example. This can lead to unreliable results. Embodiments of the systems and methods detailed herein relate to image-based 3D lane detection. Specifically, an end-to-end deep learning approach is used to output 3D points of a lane line, center line, or the like (referred to, for explanatory purposes, as lane marking herein) in real-time based on a training process. The curve-based approach to representing lane markings for training purposes, according to one or more embodiments, is better-suited to intersections and crossings where lanes are typically not straight. In real-time, the 3D points of lane markings in an image are provided based on a vector of values relative to anchor points whose positions are known.

In accordance with an exemplary embodiment, FIG. 1 is a block diagram of a vehicle 100 that performs image-based 3D lane detection. The exemplary vehicle 100 in FIG. 1 is an automobile 101. The vehicle 100 is shown with cameras 110, a radar system 130, and a lidar system 140. These exemplary sensors are not intended to limit the numbers or placement of additional sensors in and on the vehicle 100. For example, the numbers and placement of the cameras 110 may be configured to obtain a 360 degree view around the vehicle 100. A controller 120 is also shown. The controller 120 may use lane detection and other information to control one or more aspects of the operation of the vehicle 100.

According to one or more embodiments, the controller 120 also uses images from one or more cameras 110 to obtain a 3D representation of a lane marking 210 (FIG. 2) (e.g., lane line, center line) in the vicinity of the vehicle 100. To do this, the controller 120 first trains a neural network. Specifically, end-to-end deep learning is used. Deep learning involves the structuring of algorithms in layers to create a neural network that can learn and provide output on its own. End-to-end indicates that post-processing (e.g., clustering, curve fitting) of the neural network output is not needed. Instead, in real-time use following the training, the neural network output is the final desired output (i.e., 3D representations of all lane markings 210 in the image). The controller 120 includes processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
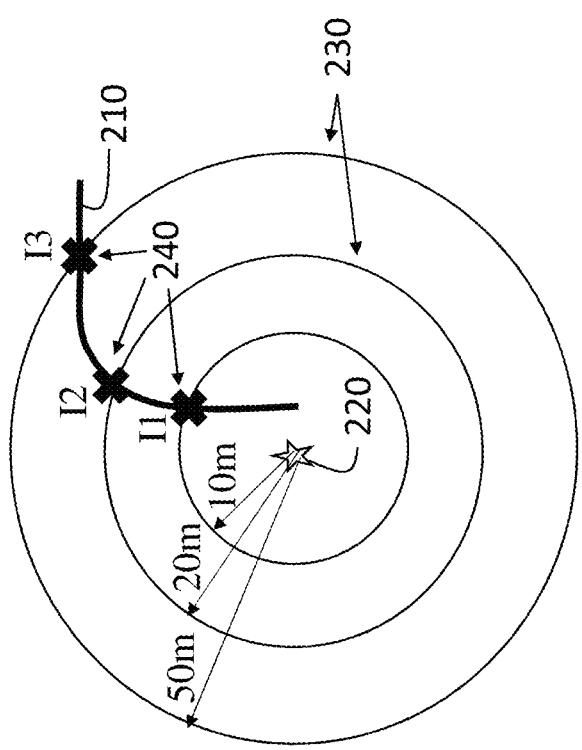
FIG. 2 illustrates aspects of training a neural network to perform image-based three-dimensional lane detection according to one or more embodiments.

FIG. 2 illustrates aspects of training a neural network to perform image-based 3D lane detection according to one or more embodiments. An overhead-view image of an exemplary lane marking 210 is shown. In the training process, which is further discussed with reference to FIG. 4, known 3D points of a lane marking 210 are used to obtain a vector relative to an anchor point 220, as detailed. An anchor point 220 is the center of three exemplary concentric circles 230. Each of the concentric circles 230 represents a radial distance (e.g., 10 meters (m), 20 m, and 50 m) from the anchor point 220, as indicated. The intersection 240 of the lane marking 210 with each concentric circle 230 is indicated and is labeled I1, I2, and I3. The 3D positions of I1, I2, and I3 are known (i.e., are ground truth) during the training process. These positions are determined using the training neural network in real-time. Each of the three exemplary intersections 240 in FIG. 2 may be represented as $<x_i, z_i>$, with i=1, 2, or 3 in the exemplary case. Each $x_i$ may be an angle between a line from the anchor point 220 to the corresponding intersection 240 and an x-axis line, sin (angle), or another representation of the intersection point 240 relative to the anchor point 220, and each $z_i$ is an elevation at the intersection 240. Because intersections 240 of the lane marking 210 with concentric circles 230 are of interest rather than intersections with lines, this radial approach, according to one or more embodiments, accommodates any shape or direction of the lane (i.e., any direction will intersect with a circle but not necessarily with a line).

As discussed with reference to FIG. 3, a vector of $<x_i, z_i>$ values may be obtained for each lane marking 210 in an image as part of the training process of the neural network implemented by the controller 120. That is, the process of obtaining a vector of $<x_i, z_1>$ values for 3D points of a lane marking 210, which is discussed with reference to FIG. 2, is iteratively repeated for different lane markings 210 during the training process. The anchor point 220 and corresponding concentric circles 230 used to determine the $<x_i, z_i>$ vector for different lanes 210 may be different. The determination of which anchor point 220 and corresponding concentric circles 230 to use is discussed with reference to FIG. 3. Some anchor points 220 may not be associated with any lane 210. Thus, every anchor point 220 may be associated with a vector of length i, where i is the number of concentric circles corresponding with the anchor point 220. In addition, every anchor point 220 may be associated with an indicator (e.g., 0, 1) of whether a lane marking 210 is associated with that anchor point 220 or not. The training of the neural network using the i-length vectors and corresponding indicator values is further discussed with reference to FIG. 4.

Figure 3:
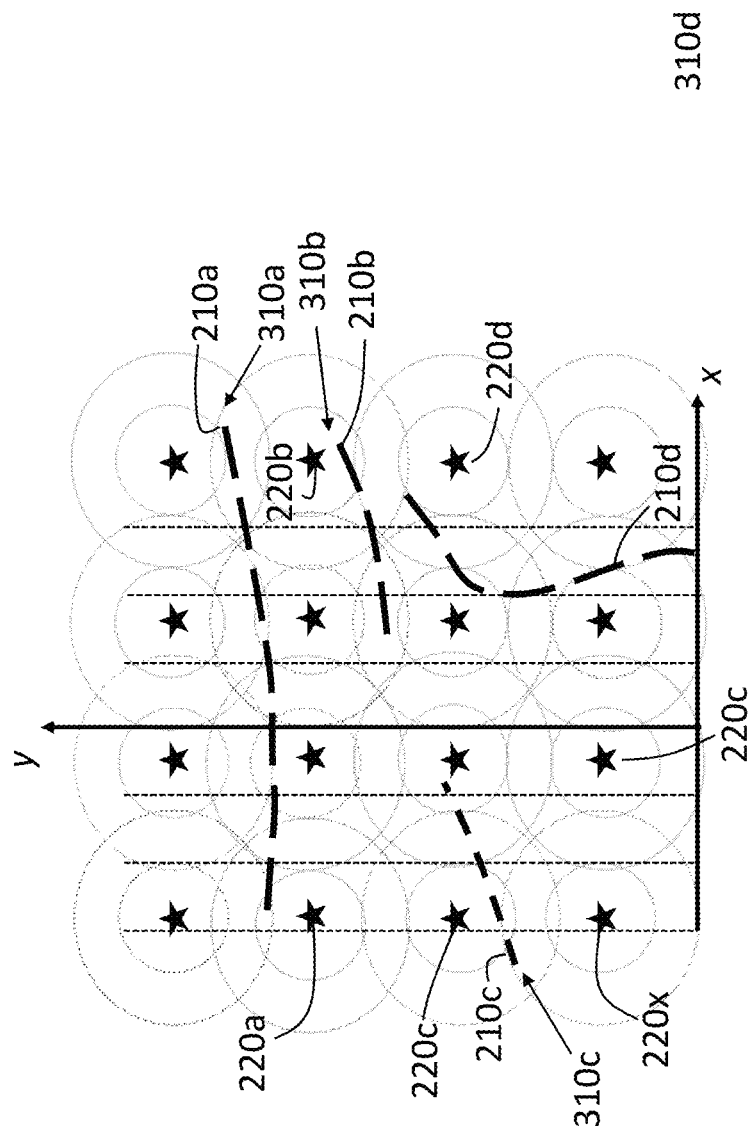
FIG. 3 illustrates additional aspects of the training process used to perform image-based three-dimensional lane detection according to one or more embodiments.

FIG. 3 illustrates additional aspects of the training process that is part of the image-based 3D lane detection according to one or more embodiments. Continuing reference is made to FIG. 2. FIG. 3 illustrates an overhead-view image showing exemplary lane markings 210 for explanatory purposes. Specifically, lane markings 210a, 210b, 210c, and 210d are indicated. The image is annotated to indicate a grid of anchor points 220 and their corresponding concentric circles 230. Each lane marking 210 is assumed to have a direction and, thus, a starting point 310 within the image. The respective starting points 310a, 310b (generally 310) of lane markings 210a and 210b are indicated. Because the illustration in FIG. 3 is part of the training process, 3D points of each of the lane markings 210a, 210b, 210c, 210d are known.

The anchor point 220 that is closest to the starting point 310 of a given lane marking 210 is the anchor point 220 associated with the lane marking 210 for the purposes of determining the i-length vector. While each anchor point 220 is shown with only two concentric circles 230, it should be understood that the number of concentric circles 230 and the distance between adjacent ones of the concentric circles 230 is not limited. The greater the number of concentric circles 230 (i.e., the greater the value of i) and the smaller the distance between them, the greater the granularity in the vectors obtained. Also, the larger the largest one of the concentric circles 230, the greater the chance that a substantial portion of a given lane marking 210 will interact with the concentric circles 230 (i.e., the given lane marking 210 will be within the concentric circles 230).

As previously noted, the concentric circles 230 associated with the anchor point 220 that is closest to the starting point 310 of a lane marking 210 are used to obtain the intersection points 240 and the i-length vector for the lane 210, according to the process discussed with reference to FIG. 2. Some anchor points 220 in the grid may not be closest to the starting point 310 of any lane marking 210. For example, anchor point 220x, which is not one of the anchor points 220a, 220b, 220c, 220d that is associated with one of the exemplary lane markings 210a, 210b, 210c, 210d, may have an indicator value of 0 to indicate that no lane marking 210 is associated with it. Alternately, because the starting point 310c of the lane marking 210c is between anchor points 220c and 220x, the indicator value associated with anchor point 220x, which is the indicator of whether a lane marking 210 is associated with that anchor point 220 or not, may be a value between 0 and 1. Further, the lane marking 210c does intersect with one of the concentric circles 230 associated with anchor point 220x, as indicated in FIG. 3. Thus, one of the i vector values will indicate the corresponding <xi, zi> value of that intersection. The fixed size (i×2) of the vector for each anchor point 220, regardless of whether a lane marking 210 is associated with the anchor point 220 or not, facilitates the training of a neural network, as further discussed with reference to FIG. 4.

Generally, ground truth (i.e., known) 3D points of lane markings 210 and corresponding images are used as input to the training process for the neural network. Using the process discussed with reference to FIGS. 2 and 3, i-length vectors and corresponding indicator values are determined for each anchor point 220 in a grid of anchor points 220 based on the 3D points. That is, the training of the neural network involves generating ground truth vector representations from ground truth 3D points corresponding to each lane marking 210 of a set of lane markings 210. Subsequently, in real-time, an image showing lane markings 210 is obtained. The controller 120 uses the trained neural network to generate vectors corresponding with each lane marking 210 indicated in the image. That is, the 3D points of the lane markings 210 are not known in real-time, but the overlay of anchor points 220 and corresponding concentric circles 230 facilitates obtaining vectors according to the process discussed with reference to FIGS. 2 and 3. Based on these vectors, the trained neural network provides 3D points for each lane marking 210. Providing the 3D points is based on the training of the neural network regarding the correspondence between the vectors and associated anchor points 220 and the 3D points.

Figure 4:
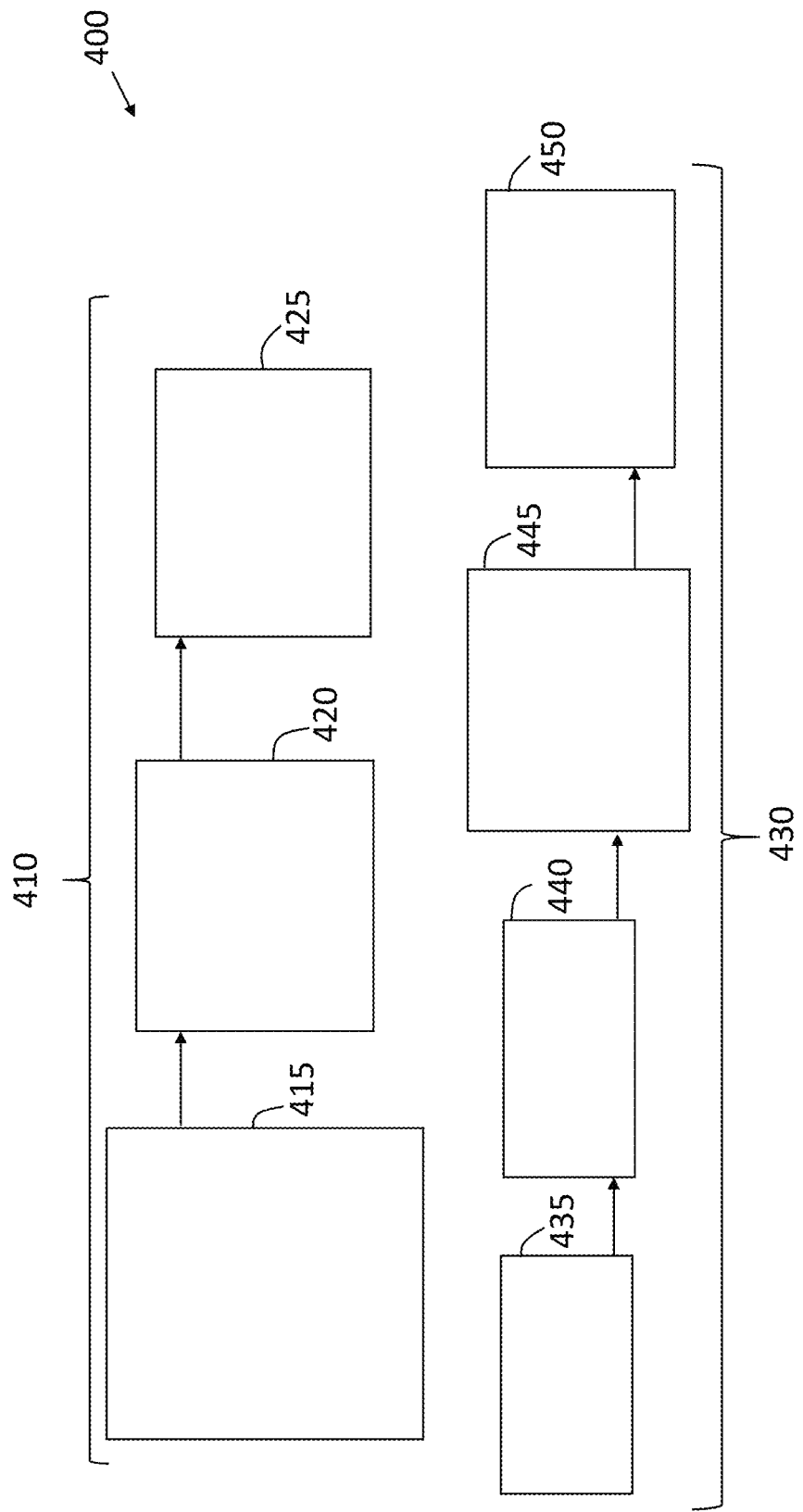
FIG. 4 is a process flow of a method of performing image-based three-dimensional lane detection according to one or more embodiments.

FIG. 4 is a process flow of a method 400 of performing image-based 3D lane detection according to one or more embodiments. Continuing reference is made to FIGS. 2 and 3. Processes that are part of the training phase 410 are distinguished from processes that are part of the real-time use phase 430. The processes of the training phase 410 may be performed iteratively for several images that include lane markings 210. At block 415, the processes of the training phase 410 include obtaining an image and a list of 3D points associated with each lane marking 210 in the image. At block 420, associating each lane marking 210 with an anchor point 220 includes overlaying a grid of anchor points 220 on the image, as shown in FIG. 3, and determining the anchor point 220 that is closest to a starting point 310 of each lane marking 210.

At block 425, generating a vector for each anchor point 220 of the grid refers to generating an i-length vector for each anchor point 220 as discussed with reference to FIGS. 2 and 3. As discussed, i is the number of concentric circles 230 associated with each anchor point 220. In addition, an indicator value is also determined for each anchor point 220 at block 425. This indicator value indicates whether that anchor point 220 is associated with a lane marking 210 or not. Alternately, the indicator value may indicate the likelihood that a given anchor point 220 is associated with a lane marking 210 (e.g., a value between 0 and 1). As previously noted, the processes at blocks 415, 420, and 425 may be repeated for different images including different lane markings 210 with known 3D points in order to train the neural network to translate between 3D points and vectors.

At block 435, the processes of the real-time use phase 430 include obtaining an image with one or more cameras 110 of the vehicle 100. For example, a combined image, such as a 360 degree surround-view image, may be obtained by stitching together images obtained by different cameras 110. Alternately, a single image from a single camera 110 may be obtained. At block 440, generating a vector per lane marking 210 refers to overlaying a grid of anchor points 220 on the image obtained at block 415 and performing the process discussed with reference to FIGS. 2 and 3. Specifically, each anchor point 220 of the grid includes i corresponding concentric circles 230, and the vector is an i-length vector generated without knowing the 3D points of the lane marking 210 but knowing the intersection of the lane marking 210 with the concentric circles 230 of an anchor point 220. The relevant anchor point 220 is the closest anchor point 210 to the starting point 310 of the lane marking 210. Again, an indicator value may also be set for each anchor point 220 to indicate its relevance with regard to any lane marking 210

(i.e., the likelihood that the anchor point 220 is closest to the starting point 310 of a lane marking 210).

At block 445, setting the starting point of each lane marking 210 as the corresponding anchor point 220 refers to setting the 3D point of the starting point 310 of the lane marking 210 as the known 3D point of the corresponding anchor point 220. At block 450, translating the vector generated at block 440 into 3D points of the lane marking 210 refers to using the neural network that was trained by generating vectors from known 3D points in the training phase 410. The 3D points of the lane markings 210, which indicate the position of the corresponding lane relative to the vehicle 100 may be used to navigate the vehicle 100 in an autonomous or semi-autonomous manner.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of performing image-based three-dimensional (3D) lane detection, the method comprising:
    obtaining known 3D points of one or more lane markings in an image including the one or more lane markings;
    overlaying a grid of anchor points on the image, wherein each of the anchor points is a center of i concentric circles;
    generating an i-length vector and setting an indicator value for each of the anchor points based on the known 3D points as part of a training process of a neural network; and
    using the neural network to obtain 3D points of one or more lane markings in a second image.

2. The method according to claim 1, further comprising, for each one of the one or more lane markings, determining a closest one of the anchor points to a starting point of the one of the one or more lane markings as being an associated anchor point of the one of the one or more lane markings.

3. The method according to claim 2, further comprising, for each one of the one or more lane markings, obtaining an intersection of the one of the one or more lane markings with each concentric circle of the associated anchor point and an elevation at the intersection.

4. The method according to claim 3, wherein, for the associated anchor point associated with each one of the one or more lane markings, the i-length vector includes i pairs of the intersection and the elevation associated with the i concentric circles and the indicator value of 1.

5. The method according to claim 2, wherein, for each of the anchor points that is not one of the associated anchor points, the i-length vector is values of <0, 0> and the indicator value is 0 or a value greater than 0 but less than 1.

6. The method according to claim 1, further comprising overlaying the grid of anchor points and the concentric circles corresponding with each of the anchor points on the second image.

7. The method according to claim 6, further comprising obtaining an i-length vector for each of the anchor points on the second image.

8. The method according to claim 7, wherein the using the neural network to obtain the 3D points of the one or more lane markings in the second image includes translating the i-length vector for each of the anchor points on the second image to the 3D points of the one or more lane markings in the second image based on the training process of the neural network.

9. The method according to claim 1, further comprising obtaining the second image using a camera of a vehicle.

10. The method according to claim 9, further comprising performing autonomous or semi-autonomous operation of the vehicle using the 3D points of the one or more lane markings in the second image.

11. A system to perform image-based three-dimensional (3D) lane detection, the system comprising:
    a camera configured to obtain an image including one or more lane markings; and
    a controller configured to obtain known 3D points of the one or more lane markings in the image, to overlay a grid of anchor points on the image, wherein each of the anchor points is a center of i concentric circles, to generate an i-length vector and an indicator value for each of the anchor points based on the known 3D points as part of a training process of a neural network, and to use the neural network to obtain 3D points of one or more lane markings in a second image.

12. The system according to claim 11, wherein, for each one of the one or more lane markings, the controller is configured to determine a closest one of the anchor points to a starting point of the one of the one or more lane markings as being an associated anchor point of the one of the one or more lane markings.

13. The system according to claim 12, wherein, for each one of the one or more lane markings, the controller is configured to obtain an intersection of the one of the one or more lane markings with each concentric circle of the associated anchor point and an elevation at the intersection.

14. The system according to claim 13, wherein, for the associated anchor point associated with each one of the one or more lane markings, the controller is configured to determine the i-length vector as i pairs of the intersection and the elevation associated with the i concentric circles and the indicator value as 1.

15. The system according to claim 12, wherein, for each of the anchor points that is not one of the associated anchor points, the controller is configured to determine the i-length vector as i values of <0, 0> and the indicator value as 0 or a value greater than 0 but less than 1.

16. The system according to claim 11, wherein the controller is further configured to overlay the grid of anchor points and the concentric circles corresponding with each of the anchor points on the second image.

17. The system according to claim 16, wherein the controller is further configured to obtain an i-length vector for each of the anchor points on the second image.

18. The system according to claim 17, wherein the controller is configured to translate the i-length vector for each of the anchor points on the second image to the 3D points of the one or more lane markings in the second image based on the training process of the neural network.

19. The system according to claim 11, wherein the camera is further configured to obtain the second image and the camera is in a vehicle.

20. The system according to claim 19, wherein the controller is further configured to perform autonomous or semi-autonomous operation of the vehicle using the 3D points of the one or more lane markings in the second image.

* * * * *